(12) United States Patent
Zhu et al.

(10) Patent No.: US 12,312,854 B2
(45) Date of Patent: May 27, 2025

(54) MULTI-ACCESS LIFTGATE

(71) Applicant: Magna Exteriors Inc., Concord (CA)

(72) Inventors: Luyao Zhu, Troy, MI (US); Marc Cogswell, Bloomfield Hills, MI (US); Robert M. Horner, Ferndale, MI (US)

(73) Assignee: Magna Exteriors Inc., Aurora (CA)

( * ) Notice: Subject to any disclaimer, the term of this patent is extended or adjusted under 35 U.S.C. 154(b) by 893 days.

(21) Appl. No.: 17/003,525

(22) Filed: Aug. 26, 2020

(65) Prior Publication Data
US 2020/0392779 A1 Dec. 17, 2020

Related U.S. Application Data

(63) Continuation-in-part of application No. PCT/US2020/033697, filed on May 20, 2020.
(Continued)

(51) Int. Cl.
*E05F 15/73* (2015.01)
*B60J 5/10* (2006.01)
(Continued)

(52) U.S. Cl.
CPC ............... *E05F 15/73* (2015.01); *B60J 5/101* (2013.01); *B60J 5/105* (2013.01); *B60R 5/04* (2013.01); *B62D 25/087* (2013.01); *E05F 15/75* (2015.01); *E05F 15/76* (2015.01); *E05Y 2400/415* (2013.01); *E05Y 2400/44* (2013.01); *E05Y 2400/45* (2013.01); *E05Y 2400/822* (2013.01);
(Continued)

(58) Field of Classification Search
CPC ................. E05F 15/73; E05Y 2400/45; E05Y 2900/532; E05Y 2900/546
See application file for complete search history.

(56) References Cited

U.S. PATENT DOCUMENTS 3,004,678 A 10/1961 Golaski
5,598,962 A * 2/1997 Schlachter ............... B60R 7/02
224/555
(Continued)

FOREIGN PATENT DOCUMENTS

CN 101318523 A 12/2008
CN 201646568 U 11/2010
(Continued)

OTHER PUBLICATIONS

International Search Report for PCT/US2020/033697 dated Aug. 17, 2020.
(Continued)

*Primary Examiner* — Daniel J Troy
*Assistant Examiner* — Susan M. Heschel
(74) *Attorney, Agent, or Firm* — Warn Partners, P.C.

(57) ABSTRACT

A multi-way liftgate assembly providing a plurality of dividers dividing the rear cargo area of a passenger vehicle into a plurality of secure areas assessable from a plurality of panels forming a liftgate to provide controlled access to one or more of those compartments. The vehicle operator has secure control of which portions of the cargo area can be selectively accessed. The multi-way liftgate assembly provides multiple secure openings to the cargo area of a vehicle that typically has only one secure opening to the cargo area. The multi-way liftgate assembly provides on-demand open height adjustment.

19 Claims, 9 Drawing Sheets

Related U.S. Application Data

(60) Provisional application No. 62/850,276, filed on May 20, 2019, provisional application No. 62/850,243, filed on May 20, 2019.

(51) Int. Cl.
  *B60R 5/04* (2006.01)
  *B62D 25/08* (2006.01)
  *E05F 15/75* (2015.01)
  *E05F 15/76* (2015.01)

(52) U.S. Cl.
  CPC ..... *E05Y 2400/86* (2013.01); *E05Y 2900/532* (2013.01); *E05Y 2900/546* (2013.01)

(56) References Cited

U.S. PATENT DOCUMENTS

| | | | |
|---|---|---|---|
| 5,876,086 A * | 3/1999 | Lagrou | B60J 5/105 296/50 |
| 7,034,485 B2 * | 4/2006 | Kuan | E05F 15/60 318/460 |
| 7,248,151 B2 * | 7/2007 | Mc Call | B60R 25/2045 340/5.2 |
| 7,543,875 B2 * | 6/2009 | Leopold | B60R 5/041 296/26.08 |
| 9,068,390 B2 | 6/2015 | Ihlenburg et al. | |
| 9,470,034 B2 | 10/2016 | Ihlenburg et al. | |
| 9,957,737 B2 * | 5/2018 | Patel | E05B 85/10 |
| 10,072,453 B2 | 9/2018 | Ihlenburg et al. | |
| 10,480,221 B2 * | 11/2019 | Cumbo | E05C 17/006 |
| 10,577,851 B2 * | 3/2020 | Polewarczyk | E05F 15/73 |
| 10,676,979 B2 * | 6/2020 | Naserian | E05F 15/73 |
| 2008/0238122 A1 | 10/2008 | Leopold et al. | |
| 2010/0264689 A1 * | 10/2010 | Lounds | B60J 5/103 296/146.8 |
| 2012/0068492 A1 | 3/2012 | Lucas et al. | |
| 2017/0341586 A1 | 11/2017 | Wang | |
| 2018/0297519 A1 | 10/2018 | Singh | |

FOREIGN PATENT DOCUMENTS

| | | |
|---|---|---|
| DE | 4407131 A1 | 6/1995 |
| DE | 19615540 A1 | 4/1997 |
| JP | S6432921 A | 2/1989 |

OTHER PUBLICATIONS

Search Report for Chinese Application No. 202080037958.1 dated Jul. 19, 2023, 3-pages.
Annex to EP Communication Pursuant to Article 94(3) for EP Application No. 20730534.3 dated Sep. 15, 2023, 2-pages.
English translation of First Office Action for China Application No. CN202080037958.1 dated Jul. 20, 2023, 11-pages.

* cited by examiner

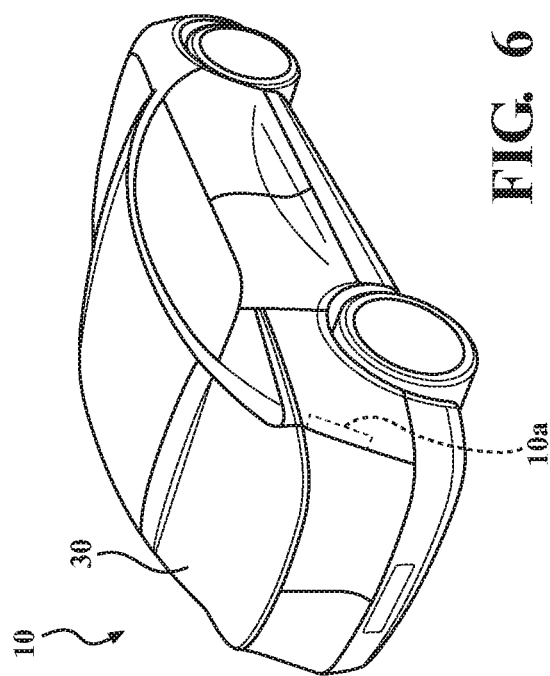
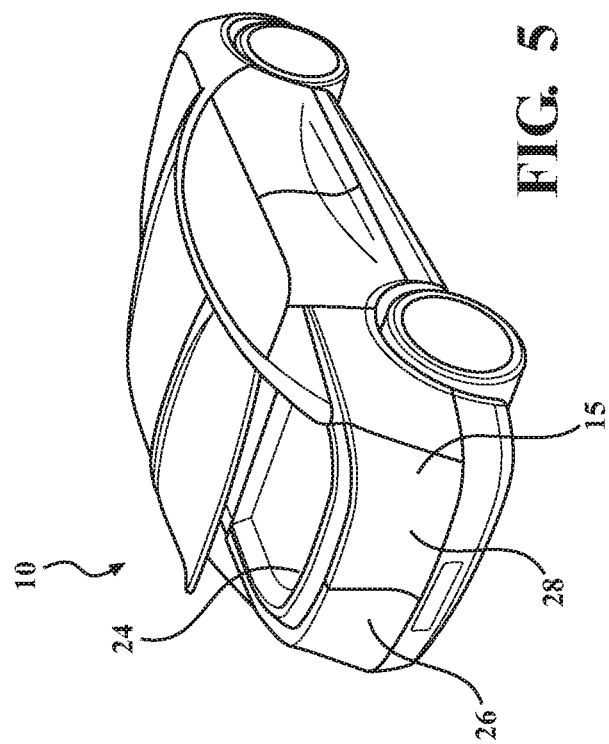

MULTI-ACCESS LIFTGATE

CROSS-REFERENCE TO RELATED APPLICATIONS

This application is a Continuation-in-Part of PCT International Application No. PCT/US2020/033697, filed May 20, 2020, and claims benefit of U.S. Provisional Patent Application No. 62/850,243 filed May 20, 2019 and of U.S. Provisional Patent Application No. 62/850,276 filed May 20, 2019. The disclosures of the above applications are incorporated herein by reference.

FIELD OF THE INVENTION

The present invention relates to a tailgate system with multiple storage and access features integrated.

BACKGROUND OF THE INVENTION

Sport utility type vehicles with liftgate doors have become predominant in the vehicle market today. Liftgate doors typically open the entire rear compartment of an SUV vehicle which has proven very convenient to users of passenger vehicles.

In manufacturing, fitting and designing liftgates is complex because the doors are large and require robust hinging and locking mechanisms. The doors are also hard to fit during production. Thus, such doors are heavy and slow to open and close. Powered liftgates are also used in recent years which are also slow to open and close.

Another known problem is that standard liftgate opening systems do not have position opening control, with the exception of a few that have a manual setting that must be set on the interior of the vehicle. Known systems have non-contact obstacle detection; sensors within the liftgate which detect an obstacle and stop a liftgate before hitting it. This works for damage mitigation, but does not allow the user to select how much the liftgate opens. A pre-set height switch is also know, which allows users to select pre-selected opening heights on the interior of the vehicle as a setting, but this does not provide on-demand selection/input.

Therefore it is a goal in the art to provide access to the rear compartment in an SUV vehicle with a liftgate, which is limited, and is rapid for providing access to the rear compartment when it is not necessary to have the entire liftgate open.

Accordingly, there also exists a need for multi-way liftgate assembly incorporating dividing the rear cargo area of a passenger vehicle (e.g., SUV, Hatchbacks and Wagons) into a plurality of secure areas (e.g., at least three secure areas), using the liftgate to provide controlled access to one or more of those compartments.

There also exists a need for position control on the outside of the liftgate providing users the ability to specify how far they would like their liftgate to open.

SUMMARY OF THE INVENTION

In accordance with the present invention there is provided a liftgate access door which allows access to the rear compartment of an SUV type vehicle without requiring opening the entire liftgate.

According to further aspects of the present invention, dividing the rear cargo area of a passenger vehicle (SUV, Hatchbacks and Wagons, etc.) into a plurality of secure areas (e.g., at least three secure areas) using the liftgate to provide controlled access to one or more of those multiple compartments.

The present invention provides liftgate access to multiple compartments. There is also provided a multi-way liftgate assembly providing a plurality of dividers dividing the rear cargo area of a passenger vehicle into a plurality of secure areas assessable from a plurality of panels forming a liftgate to provide controlled access to one or more of those compartments, in accordance with aspects of the present invention. The vehicle operator has secure control of which portions of the cargo area his fellow vehicle occupants can place and remove cargo from.

The vehicle operator has secure control of which portions of the cargo area his fellow vehicle occupants can place and remove cargo from.

According to aspects of the present invention, the present invention also provides position control on the outside of the liftgate allowing users the ability to specify how far they would like their liftgate to open. This can be less than fully open in the event there is an obstacle preventing full opening which could cause damage. The function is a variable position control of opening height on the exterior of the liftgate which is not visible until selected, whether through transparent lighting features in the glass or a light that shines through an exterior panel or film.

BRIEF DESCRIPTION OF THE DRAWINGS

The present invention will become more fully understood from the detailed description and the accompanying drawings, wherein:

FIG. 5 is a perspective view of the multi-way liftgate assembly with an upper window open only, in accordance with the present invention;

FIG. 6, is a perspective view of the multi-way liftgate assembly in a completely closed position, in accordance with the present invention;

DETAILED DESCRIPTION OF THE PREFERRED EMBODIMENTS

Figure 1:
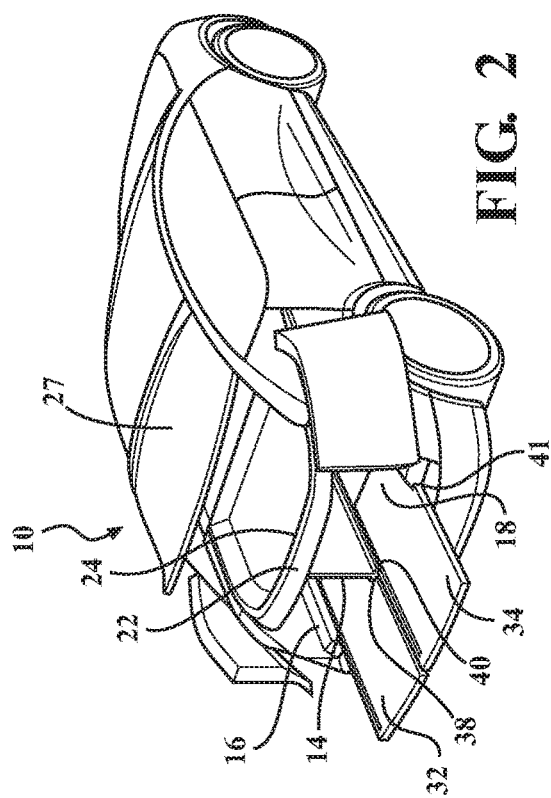
FIG. 1, is a perspective view of the multi-way liftgate assembly in a completely open position, in accordance with the present invention.

The following description of the preferred embodiment(s) is merely exemplary in nature and is in no way intended to limit the invention, its application, or uses.

Referring to FIGS. 1-10 generally, there is illustrated a multi-way liftgate assembly shown generally at 10 of a vehicle 12. SUV type vehicles 12 typically have a liftgate 15 which includes the entire back end of the vehicle having both an upper portion with a window and a lower portion which lift on hinges in an upward direction to reveal the entire rear end compartment. The liftgate assembly 10 provides at least one liftgate access door which allows access to the rear compartment of an SUV type vehicle without requiring opening the entire liftgate. The liftgate assembly 10 also provides access to storage solutions in the rear compartment, including sliding and/or divided features. The assembly 10 provides at least one divider dividing the rear cargo area of the vehicle, in accordance with aspects of the present invention. Preferably, a plurality of dividers dividing the rear cargo area of the vehicle into a plurality of secure areas assessable from a plurality of panels forming a liftgate to provide controlled access to one or more of those compartments. The vehicle operator has secure control of which portions of the cargo area can be selectively accessed. The multi-way liftgate assembly provides multiple secure openings to the cargo area of a vehicle that typically has only one secure opening to the cargo area. According to aspects of the present invention, the liftgate assembly depicted in FIGS. 1-10 is incorporated with an on-demand open height adjustment liftgate, as depicted in FIGS. 11-16 and incorporated here.

Referring more particularly to FIGS. 1-6, there is illustrated a multi-way liftgate assembly 10 of the vehicle 12. According with aspects of the present invention there is provided the liftgate assembly 10 with at least one liftgate access door which allows access to the rear compartment 20 of the SUV type vehicle 12 without requiring opening the entire liftgate 15.

In accordance with aspects of the present invention, there are a plurality of liftgate access doors that are sub-rear end compartment sized (i.e., dividing the width between lateral sides of the liftgate 15 or dividing the height of the liftgate 15 or both). A first liftgate access door 26 and second liftgate access door 28 split the width about in half (i.e., the left side door being a mirror-image to the right-side door). The actual doors 26,28 are each operably actuated to open/close. According to aspects of the present invention, the first and second doors 26,28 are operably hinged 10a for opening to the sides of the vehicle 12. Alternatively, a suitable linkage mechanism for opening to the sides of the vehicle 12. Alternatively, or additionally, a suitable robust track system is provided for allowing the liftgate access doors to move out of the way of the rear end compartment 20. This allows the access doors to be opened and cargo to be inserted into the storage compartment 20 of the vehicle 12. The liftgate access doors 26,28 are openable automatically as is known to those skilled in the art or it is a manual opening door. Preferably, the liftgate access doors 26,28 are opened automatically, independently or simultaneously, by a remote or sensor which allows hands free operation. The remote signal is a remote control, motion sensor, touch sensor, key fob or keypad. In either manual or automatic configurations, the liftgate access doors 26,28 are of a smaller size and can be opened and closed rapidly with much less time and effort than the entire liftgate 15.

In a preferred embodiment of the present invention at least one cargo tray, preferably, a plurality of cargo trays is provided to assist in loading of cargo 50. A first and a second cargo tray 32 and 34 are either manually or automatically operably slid in and out of the rear end cargo compartment as illustrated in the drawings. A suitable robust extendable track system is provided for allowing the cargo trays 32,34 to support a cargo load 50 when extended (e.g., incorporating track system 16/38 and 40/41, respectively).

Thus, in operation either or both of the doors 26 and/or 28 are opened quickly and either or both of the cargo trays 32 and/or 34 are deployed, a carry-on bag or other luggage or other cargo 50 is placed on either of the cargo trays 32,34 and then the trays 32,34 slides into the cargo compartment 20. Thereafter the doors 26,28 are closed and the vehicle 12 is ready for transport. It is understood that the trays 32,34 do not always need to be extended to place the cargo 50 unless desired.

In accordance with aspects of the present invention, a third liftgate access door 27 is provided (e.g. less than the overall height of the liftgate 15). The actual door 27 is operably actuated to open/close. According to aspects of the present invention, the third liftgate access door 27 is operably hinged 10c,10c for folding upward. This allows for the third liftgate access door 27 to be opened and cargo to be inserted into the storage compartment 20 or into an additional rear storage compartment 24 of the vehicle 12 (e.g., at least one upper compartment). The liftgate access door 27 is openable automatically as is known to those skilled in the art or it is a manual opening door. Preferably, the liftgate access door 27 is opened automatically by a remote or sensor which allows hands free operation. The remote signal is a remote control, motion sensor, touch sensor or keypad. In either manual or automatic configurations, the liftgate access door 27 is of a smaller size and can be opened and closed rapidly with much less time and effort than the entire liftgate 15. The additional compartment 24 includes no tray, however, it is contemplated that the compartment 24 could be adapted to house at least one slidable tray similar to previously described without departure from the scope of the present invention.

It is understood that more or less trays 32,34 are contemplated depending on the particular applications without departure from the scope of the present invention.

According to the present invention, at least one divider divides the rear end storage compartment 20. At least one first divider 14 (e.g., substantially vertical divider(s), horizontal divider(s), angled divider(s), central divider, more than one divider, any combination of dividers, etc.) divides the compartment area into a first and second compartment 16 and 18 (e.g., left and right compartments, side-by-side left/right, up/down, row, line, etc.).

At least one second divider 22 (e.g., substantially horizontal divider(s), horizontal divider(s), angled divider(s), central divider, more than one divider, any combination of dividers, etc.) divides the compartment area 20 into at least a third compartment 24 (e.g., at least one top compartment, at least one lower compartment, etc.), according to aspects of the present invention.

Figure 2:
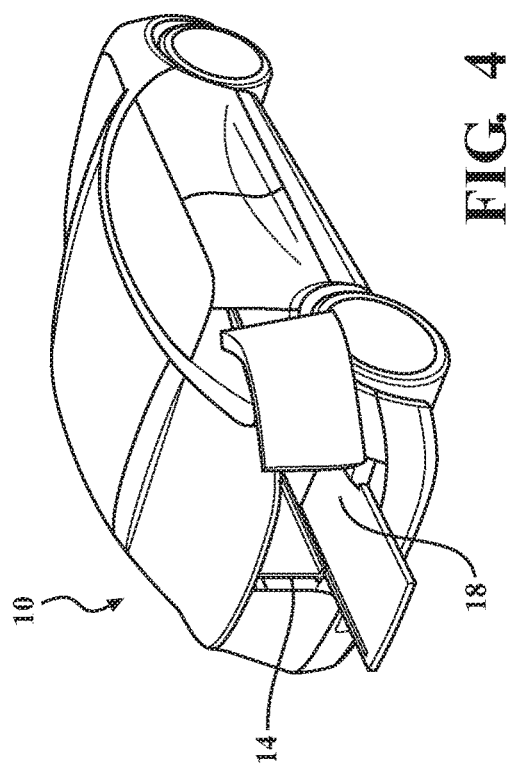
FIG. 2 is a perspective view of the multi-way liftgate assembly in a completely open position with cargo trays deployed, in accordance with the present invention.
Figure 3:
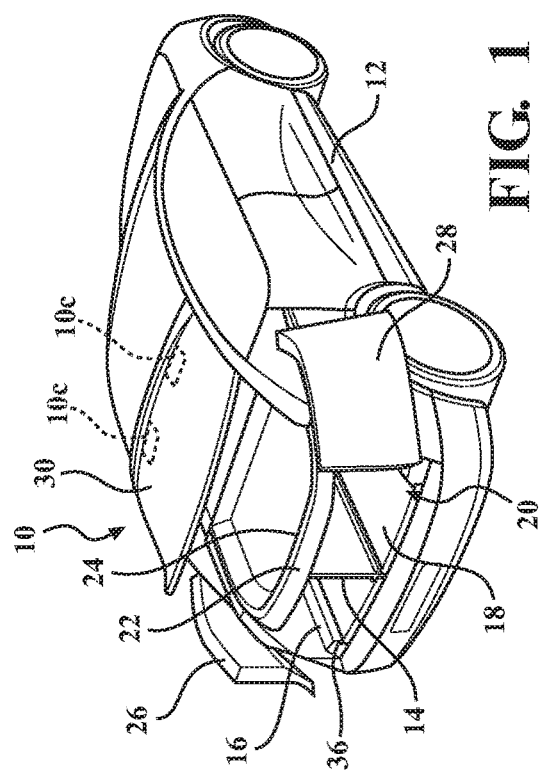
FIG. 3 is a perspective view of the multi-way liftgate assembly with a left side open only, in accordance with the present invention.
Figure 4:
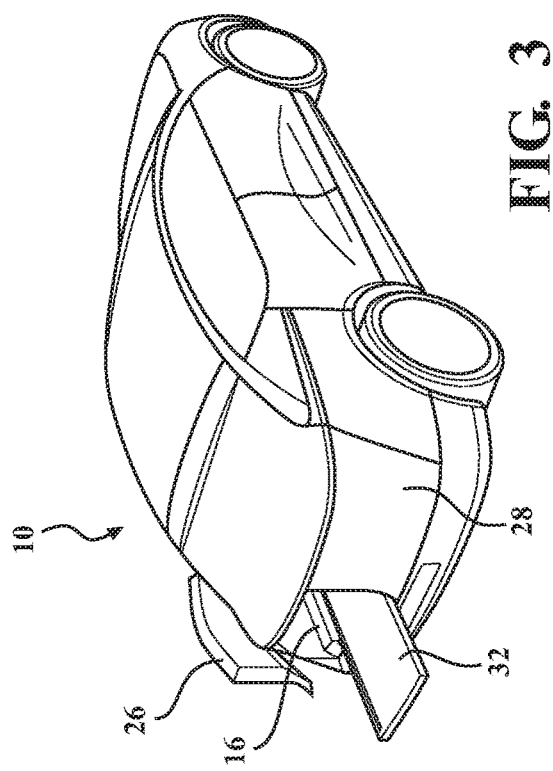
FIG. 4 is a perspective view of the multi-way liftgate assembly with a right side open only, in accordance with the present invention.
Figure 7:
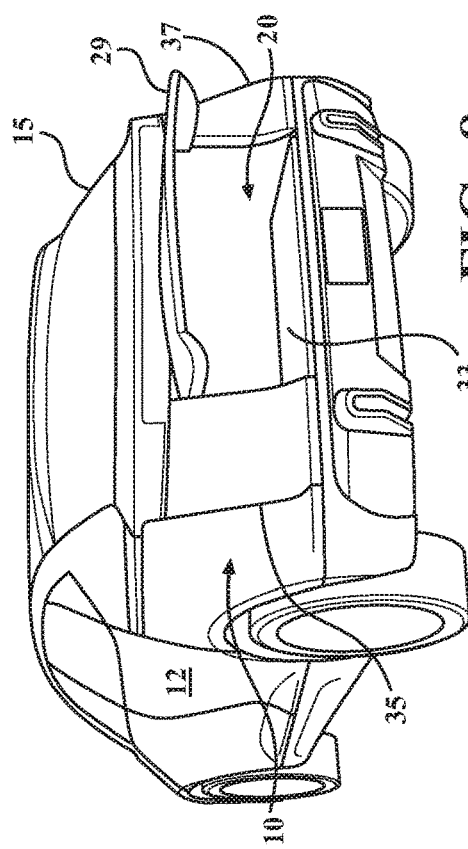
FIG. 7 is a rear perspective view of an SUV vehicle having a liftgate access door in accordance with the teachings of the present invention.
Figure 8:
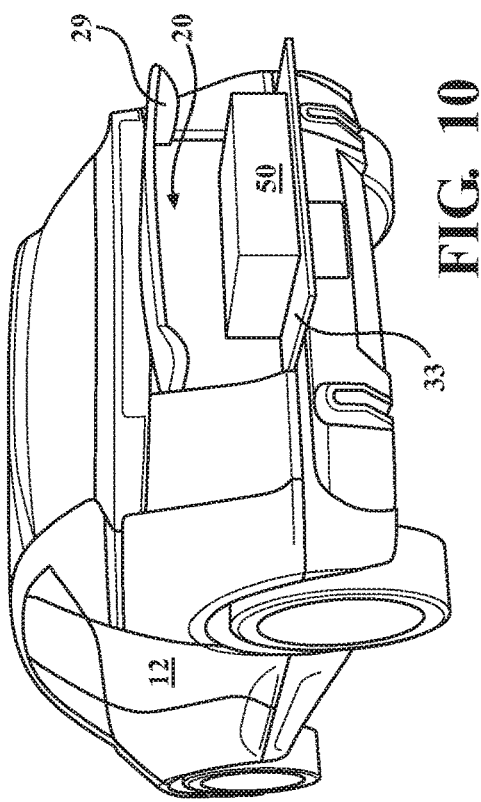
FIG. 8 is a perspective view of the SUV vehicle showing the liftgate access door of the present invention in an open configuration.
Figure 9:
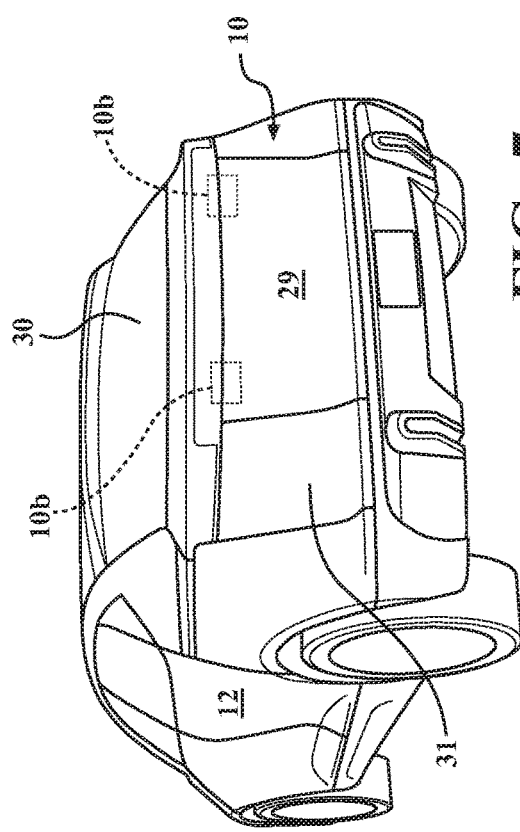
FIG. 9 is a rear perspective view of an SUV vehicle showing the liftgate access door open with a cargo tray feature deployed.
Figure 10:
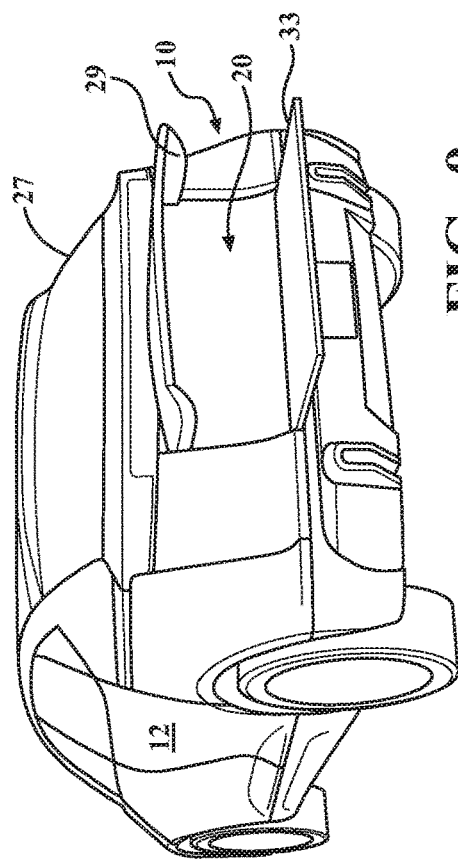
FIG. 10 is rear perspective view similar to FIG. 9 showing a package being placed ready for storage in the cargo compartment of the SUV vehicle.

The liftgate assembly 10 includes the at least one liftgate access without having to lift the entire liftgate 15. FIG. 1 depicts all three liftgate access doors 26,28,27 in an exemplary fully open position allow access into the first, second and third 16,18,24 compartments. FIG. 2 depicts the first and second trays 32,34 extended out to receive cargo. FIG. 3 depicts exemplary access to the first compartment 16 when the first liftgate access door 26 is articulated to the side to an open position and the second door 28 remains closed. FIG. 4 depicts exemplary access to the second compartment 18 when the second liftgate access door 28 is articulated to the other side to an open position and the first door 26 remains closed. FIG. 5 depicts the third liftgate access door 27 opened upward to load cargo into the third compartment 24. FIG. 6 depicts the liftgate system 10 in a fully closed position.

Preferably, the first and second access doors 26,28 are a liftgate composite material and the third access door 27 includes a window 30. It is understood that any suitable materials are contemplated depending on the application without departure from the scope of the present invention (e.g., aluminum, plastics, glass, reinforced fiber filled material, lightweight molded material, etc. and combinations thereof).

The vehicle operator has secure control of which portions of the cargo area passengers can place and remove cargo from. The present invention gives the ability to provide multiple secure openings to the cargo area of a vehicle that typically has only one secure opening to the cargo area. By separating the exterior surface into three distinct access portions and remotely controlling access to those doors, the vehicle operator has greater control of allowing access to cargo in the rear storage areas and can even provide remote access using smart phone, smart watch technology or any other smart device, application and platform.

Preferably, the assembly 10 includes suitable robust hinging systems operably adapted for the two lower access doors (e.g., 26 and 28) to be opened in dense parking situations.

Preferably, the assembly 10 includes at least one vertical divider (e.g., 14) and, most preferably, at least one horizontal divider (e.g., 22) to separate the rear end storage compartment area 20 of a SUV, hatchback or wagon or any other type of vehicle into at least three distinct compartments (e.g., 16,18,24). It is understood that any other divider configuration and orientation is contemplated depending on the application without departure from the scope of the present invention (e.g., angled, zig-zag, square, rectangular, triangular, honeycomb, a plurality of vertical dividers, a plurality of horizontal dividers and any other suitable divider and combinations thereof.

The dividers are preferably plastic. It is understood that any other divider material is contemplated depending on the application without departure from the scope of the present invention (e.g., netting, mat, rubber, sailcloth, fabric, cardboard reinforced wrapped fabric panel, canvas, tote, aluminum, metal, and any other suitable divider and combinations thereof. Optionally, the dividers are removable by a user, when desired. Optionally, the dividers can be selectively reconfigured by a user, when desired.

While a 3-way liftgate is shown and described, it is understood that more or less than three liftgate access doors are contemplated depending on the particular applications without departure from the scope of the present invention. The assembly 10 is at least a 2-way liftgate. Most preferably, a 3-way liftgate.

It is understood that any aspect(s) of FIGS. 1-6 are operably adaptable and combined depending on the particular application without departure from the scope of the present invention. It is further understood that any of the aspects of FIGS. 1-6 are operably adoptable and combinable with any aspects of FIGS. 7-10, alone or in any combination(s), depending on the application without departure from the scope of the present invention.

Referring to all of the FIGS. 1-10 generally, and more particularly to FIGS. 7-10, in accordance with aspects of the present invention there is provided the liftgate assembly indicated generally at 10 with at least one liftgate access door 29 which allows access to the rear compartment 20 of the SUV type vehicle 12 without requiring opening the entire liftgate 15.

SUV type vehicles 12 are known which typically have a liftgate 15 which includes the entire back end of the vehicle having both the window portion 30 and a lower portion 31 and has edges 35 and 37 on lateral sides. The window 30 and lower portion 31 lift on hinges in an upward direction to reveal the entire rear end compartment 20.

In the present invention the liftgate access door 29 is sub-rear end compartment sized (i.e. less than the width between gate edges 35 and 37). Preferably, the liftgate access door 29 is about the size of at least a carry-on luggage bag as defined by airplane carry on standard sized luggage. As shown in the drawings the actual door 29 has a plurality of hinges 10b for folding upward. This allows for the liftgate access door 29 to be opened and carry-on luggage bag 50 to be inserted into the storage compartment 20 of the vehicle 12. The liftgate access door 29 is openable automatically as is known to those skilled in the art or it is a manual opening door. Preferably, the liftgate access door 29 is opened automatically by a remote or sensor which allows hands free operation. The remote signal is a remote control, motion sensor, touch sensor or keypad. In either manual or automatic configurations, the liftgate access door 29 is of a smaller size and can be opened and closed rapidly with much less time and effort than the entire liftgate 15.

In a preferred embodiment of the present invention a cargo tray 33 is provided to assist in loading of cargo 50. Cargo tray 33 either manually or automatically operably slides in and out of the cargo compartment as illustrated in the drawings. A suitable robust extendable track system is provided for allowing the cargo tray 33 to support a carry load 50 when extended (e.g., incorporating system 40,41).

Thus, in operation the door 29 is opened quickly and the cargo tray 33 deployed, the carry-on bag or other luggage 50 is placed on the cargo tray 33 and then slides into the cargo compartment 20. Thereafter the door 29 is closed and the vehicle 12 is ready for transport.

It is understood that any aspect(s) of FIGS. 7-10 are operably adaptable and combined depending on the particular application without departure from the scope of the present invention. It is further understood that any of the aspects of FIGS. 7-10 are operably adoptable and combinable with any aspects of FIGS. 1-6, alone or in any combination(s), depending on the particular application without departure from the scope of the present invention. According to aspects of the present invention, the liftgate assembly depicted in FIGS. 1-10 is incorporated with an on-demand open height adjustment liftgate, as depicted in FIGS. 11-16 and incorporated here.

Referring to FIGS. 11-16 generally, the liftgate assembly generally shown at 110 is incorporated with an on-demand open height adjustment liftgate generally shown at 112. A liftgate 114 includes position control lighting generally shown at 116 suitable for predetermined on-demand control and height adjustment of the liftgate 114. The light transmissive medium projects either through glass or a transparent or translucent polymer material or any other suitable material and structure (e.g., film, glass, polymer, liquid crystals, touch activated display, infared, electric current, resistive, acoustic, capacitive, etc and any combinations thereof) The control 116 allows for selecting various heights or amount that the liftgate 114 will open. This is achieved by a touch operation. Preferably, a plurality of backlit controls are provided.

Preferably, the liftgate 112 is also provided with at least one light source is shown generally at 120. An exemplary lighting is depicted at 120 incorporated on the liftgate 114.

Position control on the outside of the liftgate 114 offers users the ability to specify how far they would like their liftgate to open, e.g., in the event there is an obstacle preventing full opening which could caused damage. The function is a variable position control of opening height on the exterior of the liftgate 12 which is not visible until selected either through transparent lighting features in the glass 118 (e.g., rear window glass) or light that shines through an exterior panel, be example panel 136. The hidden until lit appearance of the lighting 116 do not affect exterior appearance/styling of the vehicle. 122 No openings are needed for physical switches, thereby providing seamless integration. The present invention provides the end user with full control over how far they would like the liftgate to open in any situation.

Figure 11:
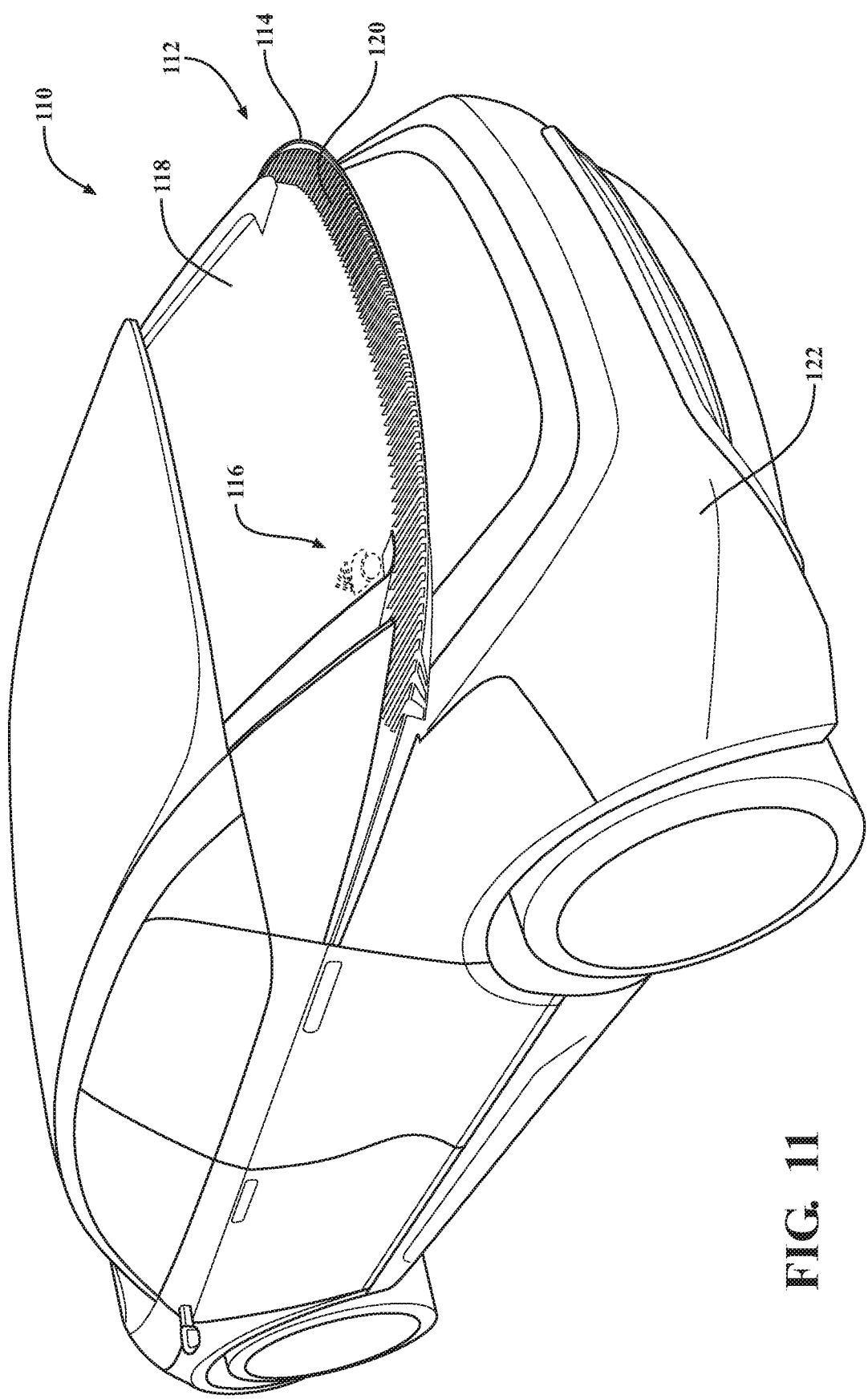
FIG. 11 is a rear perspective view of a liftgate assembly incorporating on-demand open height adjustment, in accordance with another embodiment of the present invention.
Figure 12:
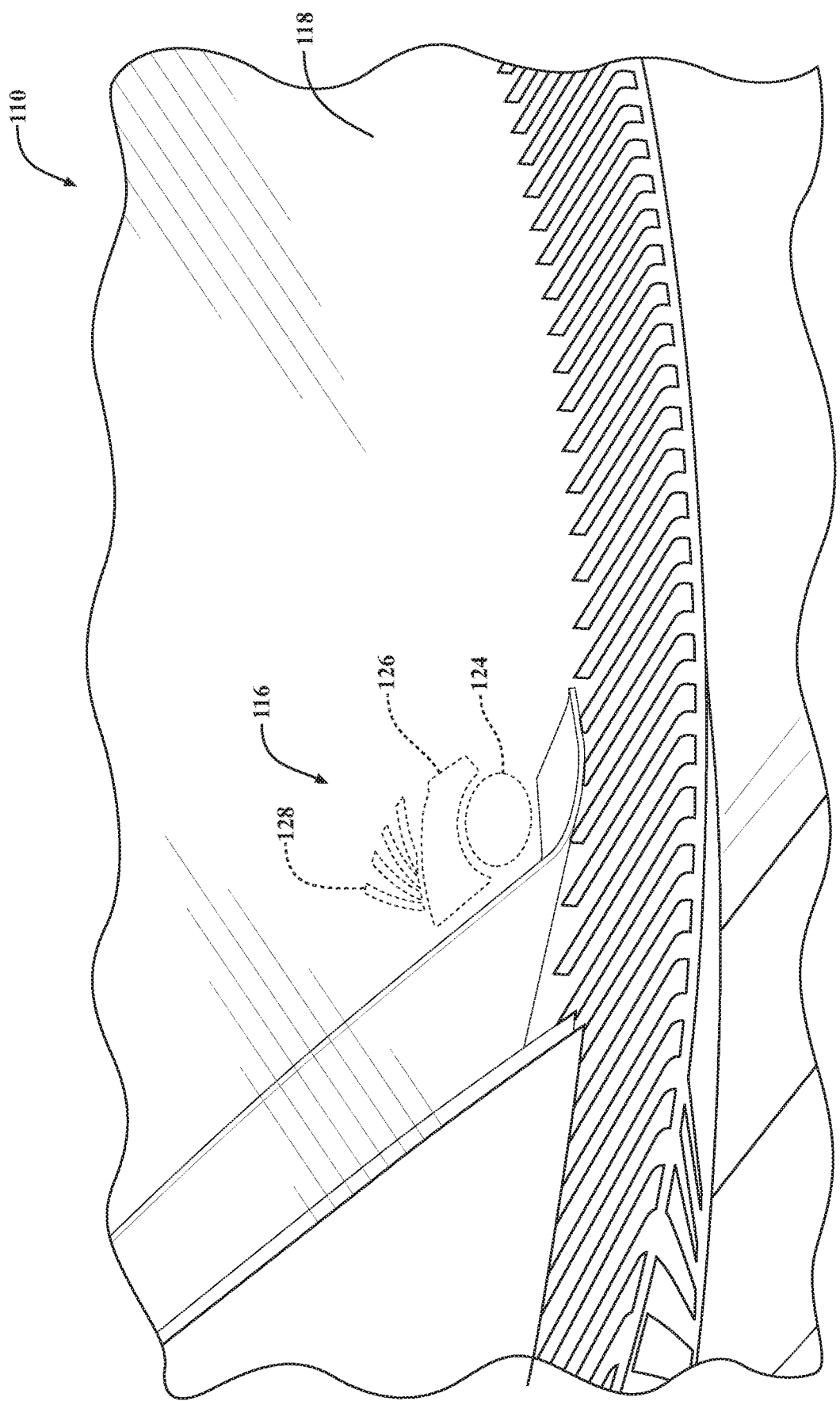
FIG. 12 is an enlarged view of FIG. 11.
Figure 13:
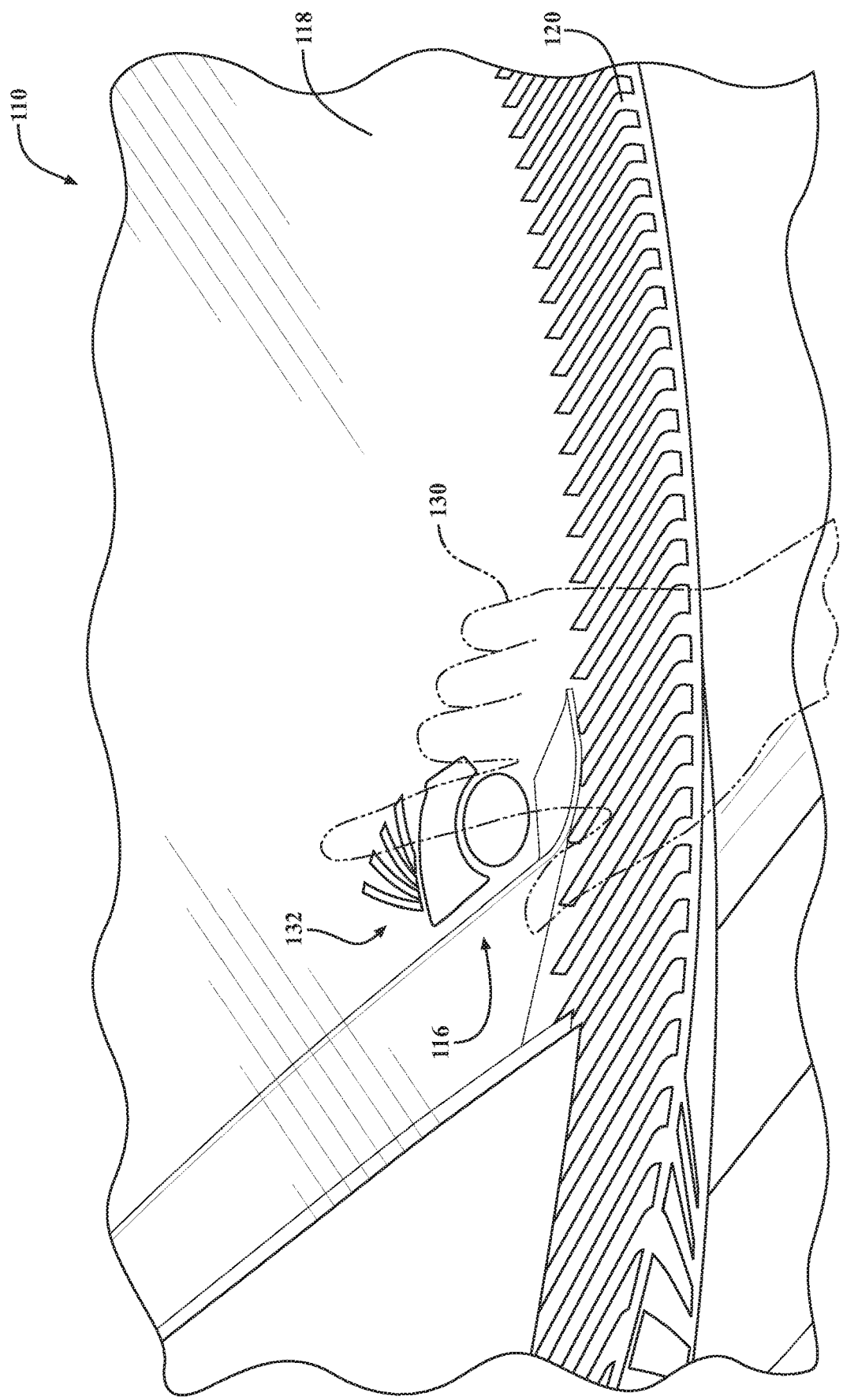
FIG. 13 is an enlarged view of FIG. 11 incorporating user interface.

The present invention provides selectable open height in multiple increments, "hidden until lit" function, touch function for selection, and the adjustment is on demand; easily used when desired, not pre-set with a switch to a set position. The liftgate 112 is also able to be stopped when opening on demand or pre-selected to desired the opening height. Referring more particularly to FIGS. 11-12 generally, the lighting feature 116 is substantially hidden when not in use. Referring more particularly to FIG. 13, the lighting 116 is illuminated when in use. An exemplary lighting and control feature 116 is depicted where a touch portion 124 (e.g., touch to launch on-demand height adjustment) is substantially hidden until tapped by a user 130. A touch function feature 126 for predetermined control, e.g., stop/go or any other predetermined function, is hidden until the lighting feature 116 is initialized by a user 130. An adjustment feature 128 for predetermined selection and control, e.g., height adjustment options, is hidden until the lighting feature is initialized or energies by the user's 130 touch. When in use, the lighting 116 is illuminated, as generally indicated at 132 in FIG. 13.

Figure 14:
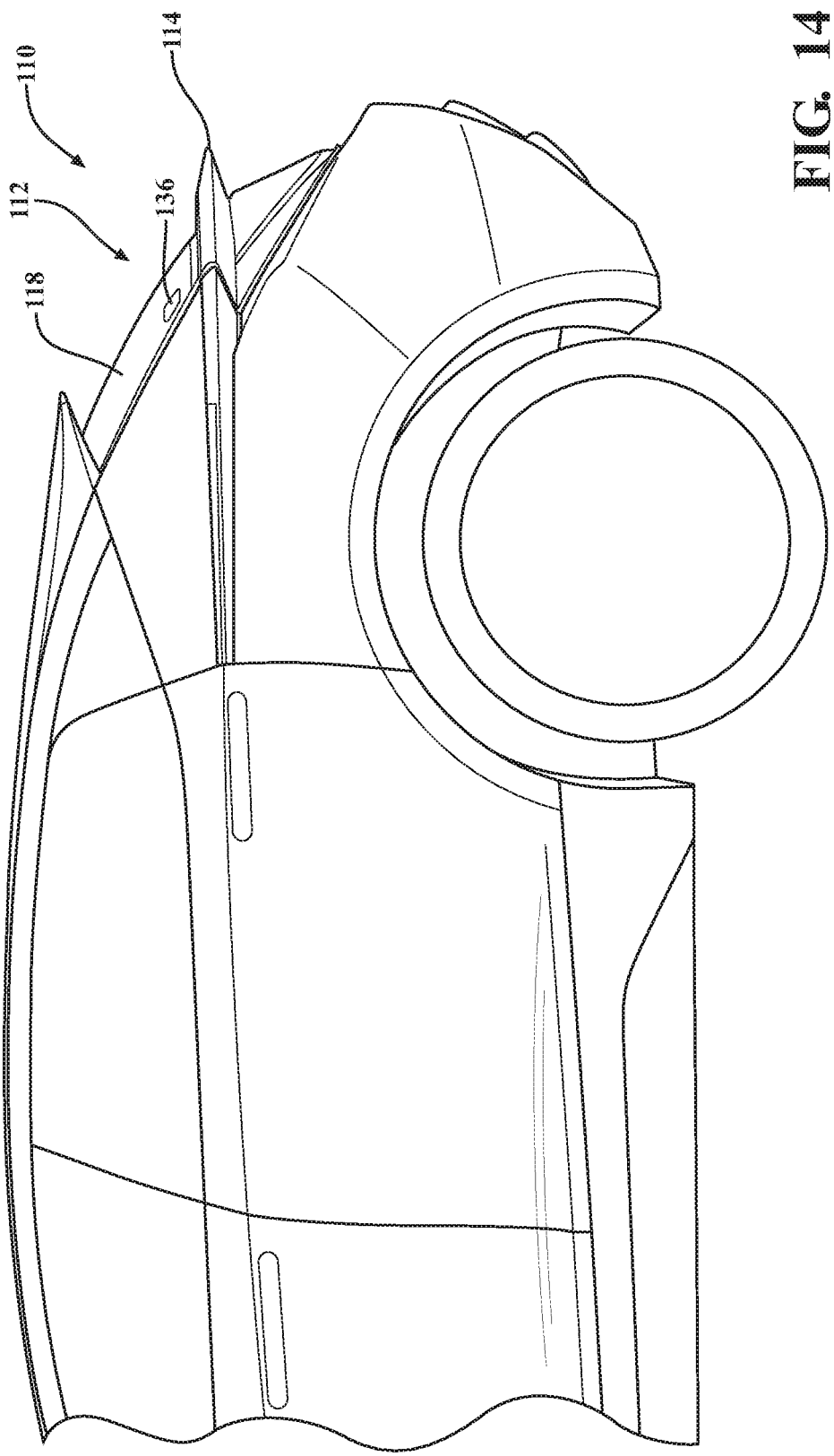
FIG. 14 is a side elevation view of the liftgate in a closed position.
Figure 15:
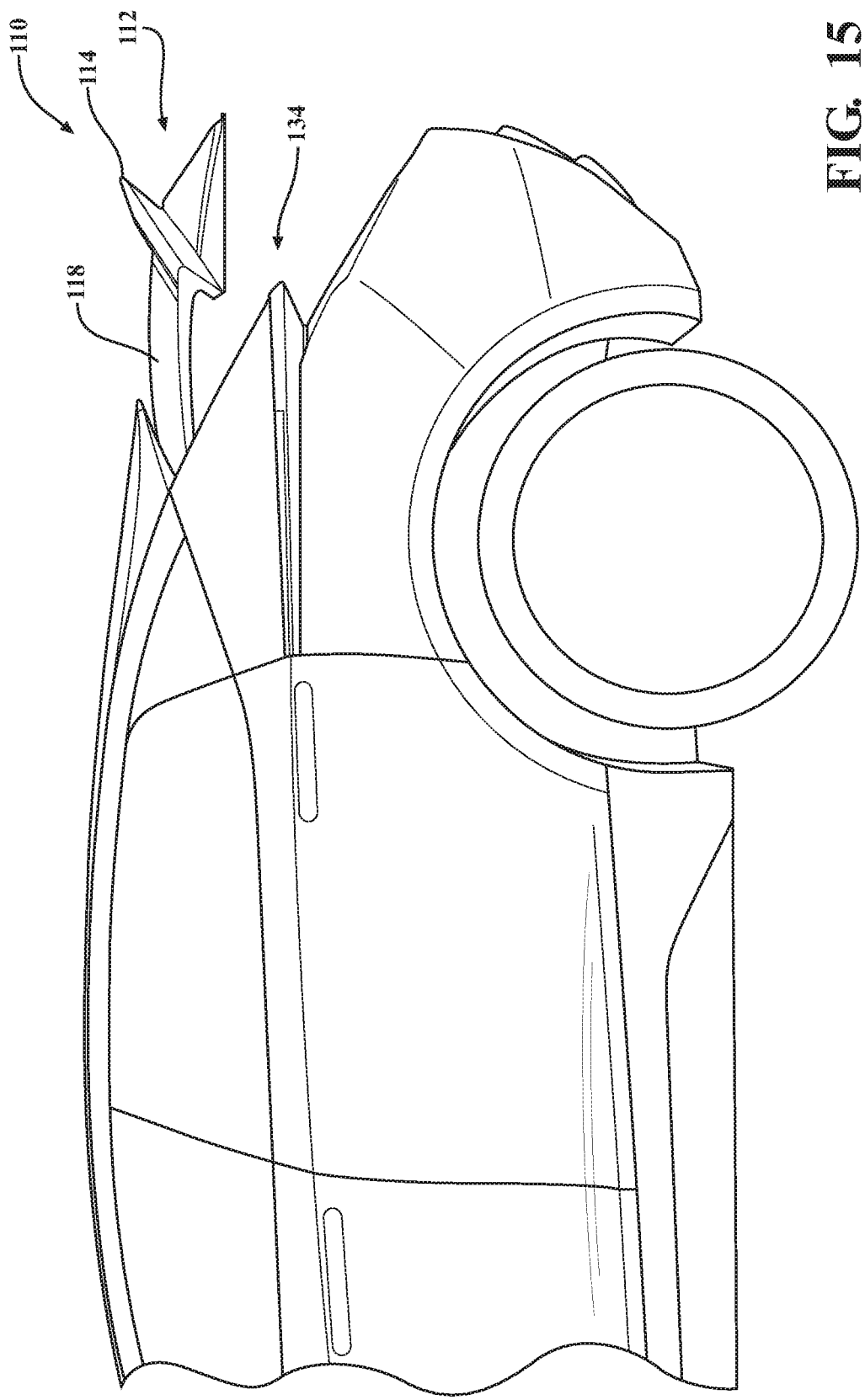
FIG. 15 is a side elevation view of the liftgate in an exemplary open position.
Figure 16:
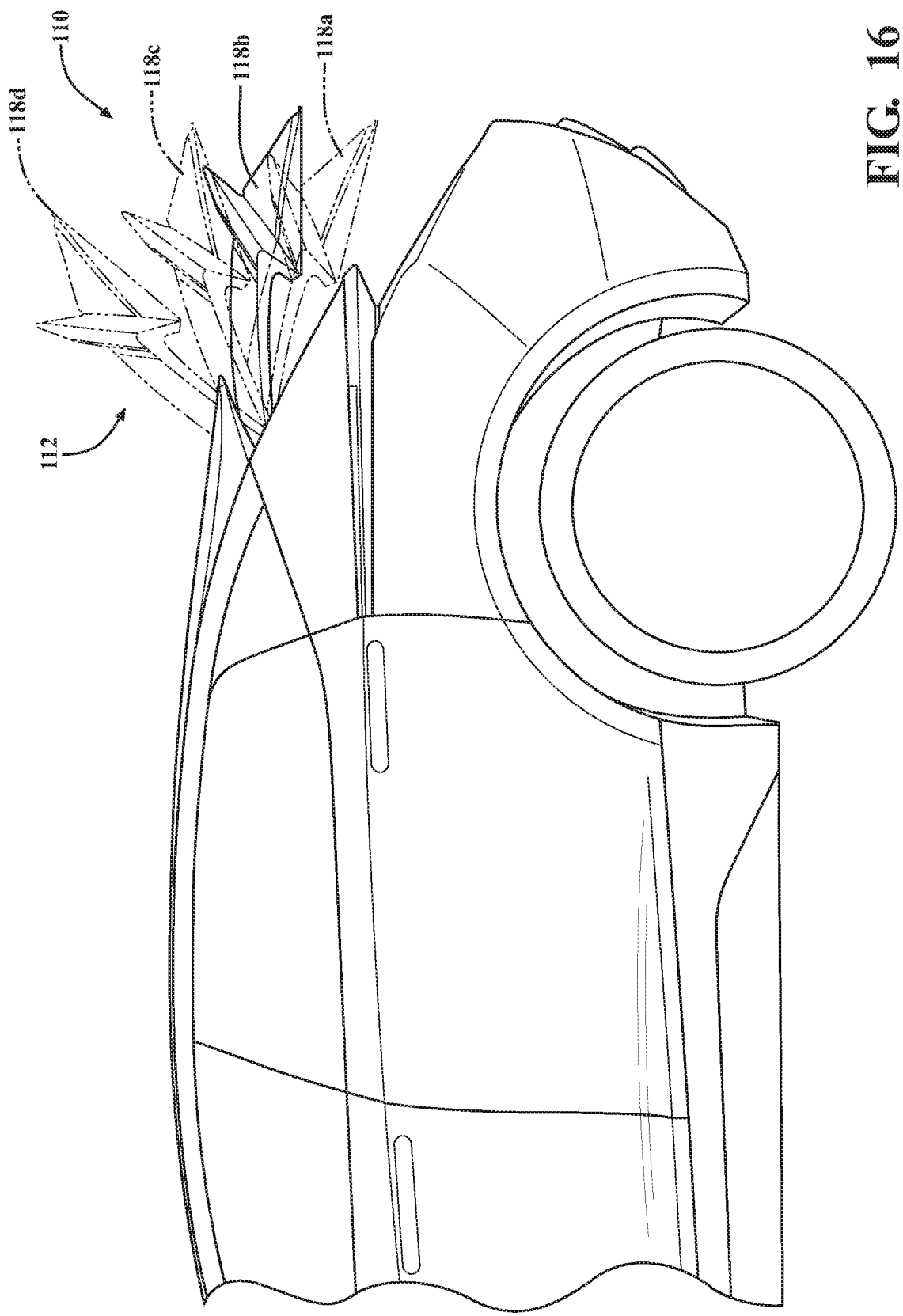
FIG. 16 is a side elevation view of the liftgate in exemplary open positions illustrated in phantom, in accordance with aspects of the present invention.

FIG. 14 depicts the liftgate 114 in a closed position. FIG. 15 depicts the liftgate 114 in an exemplary open position where liftgate 114 is at a predetermined height uncovering the opening generally depicted at 134 into the vehicle 122. FIG. 16 depicts exemplary predetermined heights selectable by the user, indicated at 18 and in phantom 118a,118b,118c and 118d. The function is a variable position control of opening height generally on the exterior of the liftgate which is not visible until selected either through transparent lighting features in the glass or light that shines through an exterior panel. The hidden until lit appearance would not affect exterior appearance/styling. Further, no openings would be needed for physical switches, allowing seamless integration. The function provides the end user with full control over how far they would like the liftgate to open in any situation.

It is understood that any aspect(s) of FIGS. 11-16 are operably adaptable and combined depending on the particular application without departure from the scope of the present invention. It is further understood that any of the aspects of FIGS. 11-16 are operably adoptable and combinable with any aspects of FIGS. 1-10, alone or in any combination(s), the disclosures of which are incorporated here, depending on the particular application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multiple-access liftgate assembly, comprising:
a plurality of liftgate access doors which selectively allows predetermined access to a plurality of rear compartments without requiring opening an entire liftgate exterior, wherein at least one of said plurality of liftgate access doors is operably hinged to open in a direction toward a side of the vehicle to an open position substantially parallel to the side of the vehicle; and
wherein a glass exterior portion of said multiple-access liftgate assembly includes a variable position control device with touch function to select an on-demand liftgate opening height adjustment before opening begins.

2. The multiple-access liftgate assembly of claim 1, wherein at least one of said liftgate access doors is less wide than sides of the liftgate exterior.

3. The multiple-access liftgate assembly of claim 1, wherein the variable position control device is accessible by a user on the exterior of the vehicle.

4. The multiple-access liftgate assembly of claim 1, wherein the variable position control device is hidden until touched by a user, the variable position control device providing on-demand open height liftgate adjustment selected by the user.

5. The multiple-access liftgate assembly of claim 1, wherein the variable position control device provides selectable predetermined opening heights of the liftgate in a plurality of increments.

6. The multiple-access liftgate assembly of claim 1, wherein the variable position control device stops the liftgate when opening on-demand by user or pre-selected to one of a plurality opening heights selected by the user.

7. The multiple-access liftgate assembly of claim 1, wherein the variable position control device is incorporated with transparent lighting features in window glass or an exterior panel.

8. The multiple-access liftgate assembly of claim 7, wherein the variable position control device provides variable position control of opening height of the liftgate on the exterior of the liftgate which is not visible until a user touches the device through the transparent lighting features in the glass or light illuminates through an exterior panel when contacted by a user.

9. The multiple-access liftgate assembly of claim 1, wherein the variable position control device provides seamless integration with no openings required to provide position control for the user on the exterior of the vehicle.

10. The multiple-access liftgate assembly of claim 1, wherein the variable position control device provides touch function height selection.

11. The multiple-access liftgate assembly of claim 1, wherein at least one of said liftgate access doors is operably hinged.

12. The multiple-access liftgate assembly of claim 1, wherein a cargo shelf is mounted at a base of a rear compartment for sliding out for receiving cargo.

13. The multiple-access liftgate assembly of claim 12, wherein the cargo shelf is slidably operably mounted to a track mechanism.

14. The multiple-access liftgate assembly of claim 1, wherein at least two of said liftgate access doors are operably hinged for opening to either side of the vehicle.

15. The multiple-access liftgate assembly of claim 1, wherein at least one of said liftgate access doors is an upper liftgate access door adapted to be operably hinged to the vehicle which allows access to at least one of said plurality of rear compartments without requiring opening the entire liftgate exterior.

16. The multiple-access liftgate assembly of claim 15, wherein two of said plurality of liftgate access doors selectively open to alongside opposing sides of the vehicle, wherein a plurality of individual secure areas is accessible from the respective liftgate access door.

17. The multiple-access liftgate assembly of claim 1, further comprising at least one divider separating said plurality of rear compartments into the plurality of individual secure areas.

18. A multiple-access liftgate assembly adapted for a vehicle, comprising:
- at least one liftgate access door which allows selectively predetermined access to a rear compartment portion operably adapted for the vehicle without requiring opening of the entire liftgate to access said rear compartment portion; and
- a variable position control device on a glass exterior portion of said liftgate assembly for on-demand liftgate opening height adjustment before opening begins.

19. A multiple-access liftgate assembly for a vehicle, comprising:
- at least one rear cargo compartment;
- at least one divider splitting the rear cargo compartment into a plurality of separate secure areas;
- a plurality of liftgate access doors formed in a liftgate exterior to allow access into respective secure compartment areas without requiring opening the entire liftgate; and
- a variable position control device for on-demand liftgate opening height adjustment selected by a user on a glass exterior portion of the exterior of the liftgate assembly before opening begins.

* * * * *